(12) United States Patent
Choi et al.

(10) Patent No.: US 8,681,200 B2
(45) Date of Patent: Mar. 25, 2014

(54) VIDEO TELEPHONY APPARATUS AND METHOD FOR MOBILE TERMINAL

(75) Inventors: Woo-Young Choi, Incheon (KR); Wook-Hyun Jeong, Seoul (KR); Mi-A Oh, Seoul (KR); Sung-Ik Park, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 2031 days.

(21) Appl. No.: 11/584,330

(22) Filed: Oct. 20, 2006

(65) Prior Publication Data

US 2007/0126859 A1 Jun. 7, 2007

(30) Foreign Application Priority Data

Nov. 3, 2005 (KR) ........................ 10-2005-0104906

(51) Int. Cl.
*H04N 7/14* (2006.01)
(52) U.S. Cl.
CPC ...................................... *H04N 7/14* (2013.01)
USPC ................... 348/14.02; 348/14.01; 348/14.08
(58) Field of Classification Search
USPC ............................... 348/14.01–14.16; 726/26
See application file for complete search history.

(56) References Cited

U.S. PATENT DOCUMENTS

| | | | |
|---|---|---|---|
| 5,907,604 A | 5/1999 | Hsu | |
| 6,212,547 B1 | 4/2001 | Ludwig et al. | |
| 6,515,695 B1 * | 2/2003 | Sato et al. | 348/14.08 |
| 2003/0041326 A1 | 2/2003 | Novak et al. | |
| 2003/0139175 A1 * | 7/2003 | Kim | 455/419 |
| 2003/0222889 A1 | 12/2003 | Parulski et al. | |
| 2004/0207722 A1 | 10/2004 | Koyama et al. | |
| 2005/0073574 A1 | 4/2005 | Krisbergh et al. | |
| 2005/0207433 A1 * | 9/2005 | Ni | 370/401 |

FOREIGN PATENT DOCUMENTS

| | | |
|---|---|---|
| EP | 0 641 141 | 3/1995 |
| EP | 1 263 244 | 12/2002 |
| JP | 1-212056 | 8/1989 |
| JP | 2000-092086 | 3/2000 |
| KR | 1020000034282 | 6/2000 |
| KR | 1020000035675 | 6/2000 |
| KR | 1020000042799 | 7/2000 |
| KR | 1020020026998 | 4/2002 |
| WO | WO 02/37848 | 5/2002 |

* cited by examiner

*Primary Examiner* — Melur Ramakrishnaiah
(74) *Attorney, Agent, or Firm* — The Farrell Law Firm, P.C.

(57) ABSTRACT

Provided is a video telephony apparatus and method for mobile terminals. The video telephony apparatus includes a controller, a display unit, a codec, and a content controller. The controller exchanges protocol signals for a video call with the other party terminal, and demultiplexes a moving image and a voice that are received from the other party terminal. The display unit displays the received moving image, and the codec plays the received voice. The content controller manages Right Objects (ROs) of multimedia contents received from the other party terminal, and captures the displayed moving image and the played voice according to the ROs. Accordingly, it is possible to protect portrait rights during the video call.

17 Claims, 6 Drawing Sheets

VIDEO TELEPHONY APPARATUS AND METHOD FOR MOBILE TERMINAL

PRIORITY

This application claims priority under 35 U.S.C. §119 to an application entitled "Video Telephony Apparatus and Method for Mobile Terminal" filed in the Korean Intellectual Property Office on Nov. 3, 2005 and assigned Ser. No. 2005-104906, the contents of which are incorporated herein by reference.

BACKGROUND OF THE INVENTION

1. Field of the Invention

The present invention relates generally to a video telephony apparatus and method for mobile terminals, and in particular, to a video telephony apparatus and method for protecting a portrait right during a video call.

2. Description of the Related Art

With the development of electronic and communication industries, usage of mobile terminals is becoming popular and the mobile terminals are being more developed to have multi-functional features for satisfying user's demands while having reduced size, thickness and weight.

In addition to the basic call function, the mobile terminals provide a variety of additional functions of downloading music files to enjoy music, downloading Video On Demand (VOD) files to enjoy moving images, and photographing objects to store the object images in album.

Moreover, a variety of peripheral devices attached to the mobile terminals are also being developed. Examples of the peripheral devices are detachable or built-in digital cameras, TV receivers capable of receiving over-the-air broadcasting, and ear microphones attached to provide a convenient call function. In particular, camera phones came into the market in April 2002 and have attracted sensational popularity. Nowadays, 5 mega-pixel high-quality camera phones are on the market.

The camera phones are used to photograph still and moving images, and are expected to be used for video telephony. Hereinafter, terminals capable of providing a video telephony function are referred to as "video telephony terminals".

An example of a video telephony system is the International Mobile Telecommunications-2000 (IMT-2000) wireless system. The IMT-2000 wireless system includes 2.5th generation (2.5G) and 3rd generation (3G) wireless systems such as Evolution Data Only/Evolution Data and Voice (EVDO/EVDV) systems and a Wideband Code Division Multiple Access (WCDMA) systems.

In the video telephony system, a calling terminal and a called terminal exchange moving image streams with each other through a packet-switched network or a circuit-switched network, which is controlled using the H.245 protocol. The H.245 protocol defines control messages for mediating performances and channels between video telephony terminals. These control messages are used to perform functions such as capability exchange, opening/closing of logical channels, mode request, flow control, and general command.

The H.245 protocol is also use to negotiate compatibility between video telephony terminals and to control Quality of Service (QoS). The QoS control includes frame/bit rate control, image size control, and fast update request.

In the video telephony system, when a calling terminal compresses and transmits a moving image of a calling user to a called terminal, the called terminal restores the compressed moving image to an original moving image and displays the original moving image on its display unit. Likewise, when the called terminal compresses and transmits a moving image of a called user to the calling terminal, the calling terminal restores the compressed moving image to an original moving image and displays it on its display unit.

A conventional video telephony system provides a general video telephony function for a calling user to call the other party while viewing an image of the other party directly. In addition to the general video telephony function, a variety of convenient functions are being developed to accommodate general users. An example of the convenient functions is a camcorder function for a user to record and play moving images in a non-call state. Another example is a function for transmitting recorded moving images to the other party through a Multimedia Message Service (MMS).

There is an increasing desire to store an image of the other party in real time during a video call. What is actually proposed is a function for a user to store a facial image of the other party in real time during a video call.

In case where a function for storing an image of the other party during a video call is provided, there is a possibility that a receiving party may store and reuse or distribute an image of a transmitting party without the transmitting party's permission. At the present time, there are no restrictions on the use of stored image (or multimedia) contents. Therefore, the receiving party can freely use the stored image contents without restriction. For example, the receiving party can move the stored image data into his computer or other devices and also can copy and edit the stored image data.

However, the portrait right and use right for the image contents of the transmitting party belong to the transmitting party that is a content provider. Therefore, the receiving party must obtain the permission of the transmitting party in order to use the image contents of the transmitting party.

A similar concept is Digital Right Management (DRM) whereby a user obtains a predetermined right to use multimedia contents by paying a mobile communication operator a fee for the user of the multimedia contents. Accordingly, it is difficult to apply the current DRM concept to a video call service. What is required, therefore, is a scheme for protecting image contents during a video call.

SUMMARY OF THE INVENTION

An object of the present invention is to substantially solve at least the above problems and/or disadvantages and to provide at least the advantages below. Accordingly, an object of the present invention is to provide an apparatus and method for protecting a portraits right during a video call using mobile terminals.

Another object of the present invention is to provide an apparatus and method for restricting the rights to capture, store and use multimedia contents of the other party during a video call using mobile terminals.

According to one aspect of the present invention, a video telephony apparatus for a mobile terminal includes a controller for exchanging protocol signals for a video call with an other party terminal, and demultiplexing a moving image and a voice that are received from the other party terminal; a display unit for displaying the received moving image; a codec for playing the received voice; and a content controller for managing Right Objects (ROs) of multimedia contents received from the other party terminal, and capturing the displayed moving image and the played voice according to the ROs.

According to another aspect of the present invention, a video telephony method for a mobile terminal includes determining if a multimedia content capture request message is received from an other party terminal during a video call; and if the multimedia content capture request message is received, transmitting a response message including ROs of multimedia contents to the other party terminal, the ROs of multimedia contents being set by a user of the mobile terminal.

According to a further aspect of the present invention, a video telephony method for a mobile terminal includes determining if a user of the mobile terminal selects to capture multimedia contents from an other party terminal during a video call; if the capturing mode is selected, transmitting a multimedia content capture request message to the other party terminal; and receiving a response message including ROs of multimedia contents from the other party terminal.

According to still another aspect of the present invention, a video telephony method includes performing a video call between a first mobile terminal and a second mobile terminal; transmitting a multimedia content capture request message from the second mobile terminal to the first mobile terminal during the video call; transmitting a response message including ROs of multimedia contents from the first mobile terminal to the second mobile terminal, the ROs being preset by a user of the first mobile terminal; and capturing multimedia contents of the other party at the second mobile terminal according to he ROs, the other party being the user of the first mobile terminal.

According to yet another aspect of the present invention, a video telephony method includes exchanging protocol signals for a video call between a first mobile terminal and a second mobile terminal to set up a call therebetween; exchanging preset Right Objects (ROs) of multimedia contents between the first mobile terminal and the second mobile terminal after the call setup; performing the video call after the exchange of the preset ROs; transmitting a multimedia content capture request message from the second mobile terminal to the first mobile terminal during the video call; transmitting a response message including a capture permission/rejection notice from the first mobile terminal to the second mobile terminal; and if the response message includes a capture permission notice, capturing multimedia contents of the other party at the second mobile terminal according to the exchanged ROs, the other party being a user of the first mobile terminal.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail because they would obscure the present invention.

The present invention provides a scheme for restricting the rights to capture, store and use multimedia contents of the other party during a video call using mobile terminals.

In the following description, Right Objects (ROs) of multimedia contents are defined as codes for protecting portrait rights and contents. The RO codes can be broadly classified into the following two categories.

1) A first RO code indicates whether to permit a receiving party (i.e., the other party) to capture and store a transmitting party's moving image, still image and voice that are being played in a receiving terminal (i.e., the other party terminal). At this point, the capturing and storing of the transmitting party's moving image, still image and voice may be permitted totally, partially or selectively.

2) A second RO code indicates whether to permit the receiving party to reproduce, edit and distribute the stored image and voice.

The first RO code and the second RO code may be simultaneously or separately transmitted to the receiving terminal.

Figure 1:
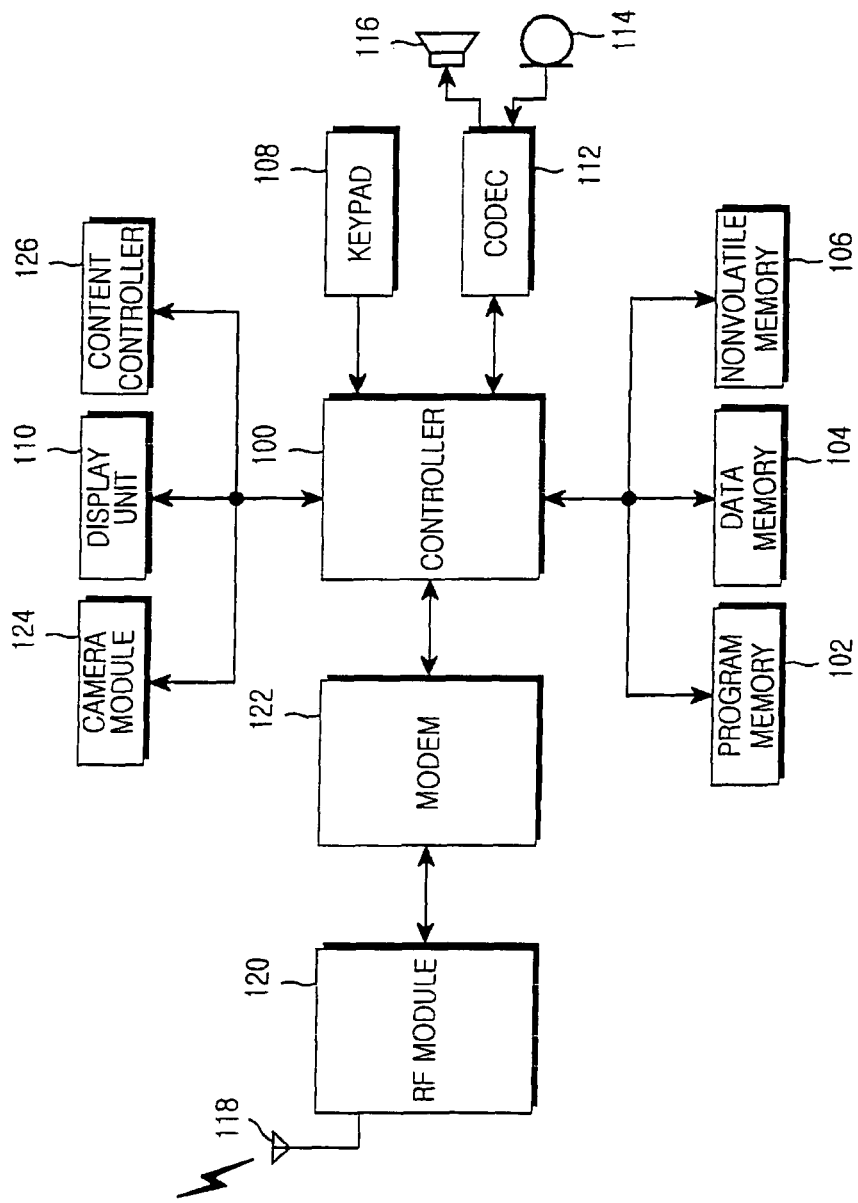
FIG. 1 is a block diagram of a typical mobile terminal according to the present invention.

FIG. 1 is a block diagram of a typical mobile terminal with a video telephony function according to the present invention. Examples of the mobile terminal with a video telephony function are Personal Data Assistants (PDAs), International Mobile Telecommunications-2000 (IMT-2000) terminals, and 4th-generation (4G) broadband system terminals. The following description is made in terms of the general structure of the above terminals.

Referring to FIG. 1, the mobile terminal includes a controller 100, a program memory 102, a data memory 104, a nonvolatile memory 106, a keypad 108, a display unit 110, a coder-decoder (codec) 112, a microphone 114, a speaker 116, an antenna 118, a radio-frequency (RF) module 120, a modem 122, a camera module 124, and a content controller 126.

The controller 100 controls the overall operation of the mobile terminal. According to the present invention, the controller 100 drives an H.324M protocol stack for a video call. That is, the controller 100 connects/disconnects a call, and multiplexes/demultiplexes video and audio signals that are transmitted/received to/from the other party terminal.

An H.245 protocol layer transmits/receives control messages for mediating performances and channels between mobile terminals. The H.245 protocol layer processes control commands for requesting storage of video contents and transmitting a security key of a transmitting party. A detailed description about the general control operation of the controller 100 will be omitted for conciseness.

The program memory 102 stores a program for controlling the overall operation of the mobile terminal. The program memory 102 may be a flash memory. The data memory 104 temporarily stores data generated during the operation of the mobile terminal. The data memory 104 may be a random access memory (RAM). The nonvolatile memory 106 stores system parameters and a variety of updatable data such phone numbers, Short Message Service (SMS) messages, and image data. The nonvolatile memory 106 may be an Electrically Erasable Programmable Read-Only Memory (EEPROM). The memories 102, 104 and 106 manage the types, titles, sizes, substances, creation dates, codec information, and ROs of stored contents (e.g., moving images, pictures, MMS messages, SMS messages, E-mails).

The keypad 108 includes numeric keys of digits 0-9 and a plurality of function keys, such as a Menu key, a Cancel (delete) key, a Confirmation key, a Talk key, an End key, an Internet connection key, and Navigation keys (▲/▼/◄/►). The keypad 108 provides the controller 100 with key input data corresponding to a key pressed by a user. The display unit 110 displays status information (or indicators) generated during the operation of the mobile terminal, numerals and characters, moving images and still images, and so on. The display unit 110A may be a color Liquid Crystal Display (LCD).

The codec 112 connected to the controller 100, and the speaker 116 and the microphone 114 connected to the codec 112 constitute a voice input/output block that is used for voice calls. The codec 112 converts Pulse Code Modulation (PCM) data received from the controller 100 into analog voice signals to output the analog voice signals to the speaker 116. Also, the codec 112 converts voice signals received from the microphone 114 into PCM data to provide the PCM data to the controller 100.

The RF module 120 down-converts an RF signal received through the antenna 118 to provide the resulting baseband signal to the modem 122. Also, the RF module 120 up-converts a baseband signal provided from the modem 122 to transmit the resulting RF signal through the antenna 118. The modem 122 processes the baseband signals that are exchanged between the RF module 120 and the controller 100. In the case of CDMA communication, the modem 122 performs channel coding and spreading on data to be transmitted and performs despreading and channel decoding on received data.

The camera module 124 includes a sensor for photographing an image of a target object and an image processor for converting analog electrical signals received from the sensor into digital data and performing image processing on the digital data. The sensor may be a Complementary Metal Oxide Semiconductor (CMOS) sensor or a Charge Coupled Device (CCD). The camera module 124 photographs an image of a target object through a lens, and converts the photographed image data (e.g., YUV data) into display data (e.g., RGB data) to output the display data to the display unit 110. If the mobile terminal is in a video call mode, the camera module 124 outputs the photographed image data not only to the display unit 110 but also to the controller 100 so as to transmit the photographed image data to a receiving terminal.

The content controller 126 controls a multimedia content capture program, manages security-related encryption keys and RO settings, and controls contents according to the RO settings.

The operations of the present invention will now be described in detail. Hereinafter, mobile terminals participating in a video call are referred to as a first mobile terminal and a second mobile terminal. The following description is made assuming that the second mobile terminal transmits a multimedia content capture request message to the first mobile terminal and the first mobile terminal transmits a corresponding content RO to the second mobile terminal in response to the multimedia content capture request message.

Figure 2:
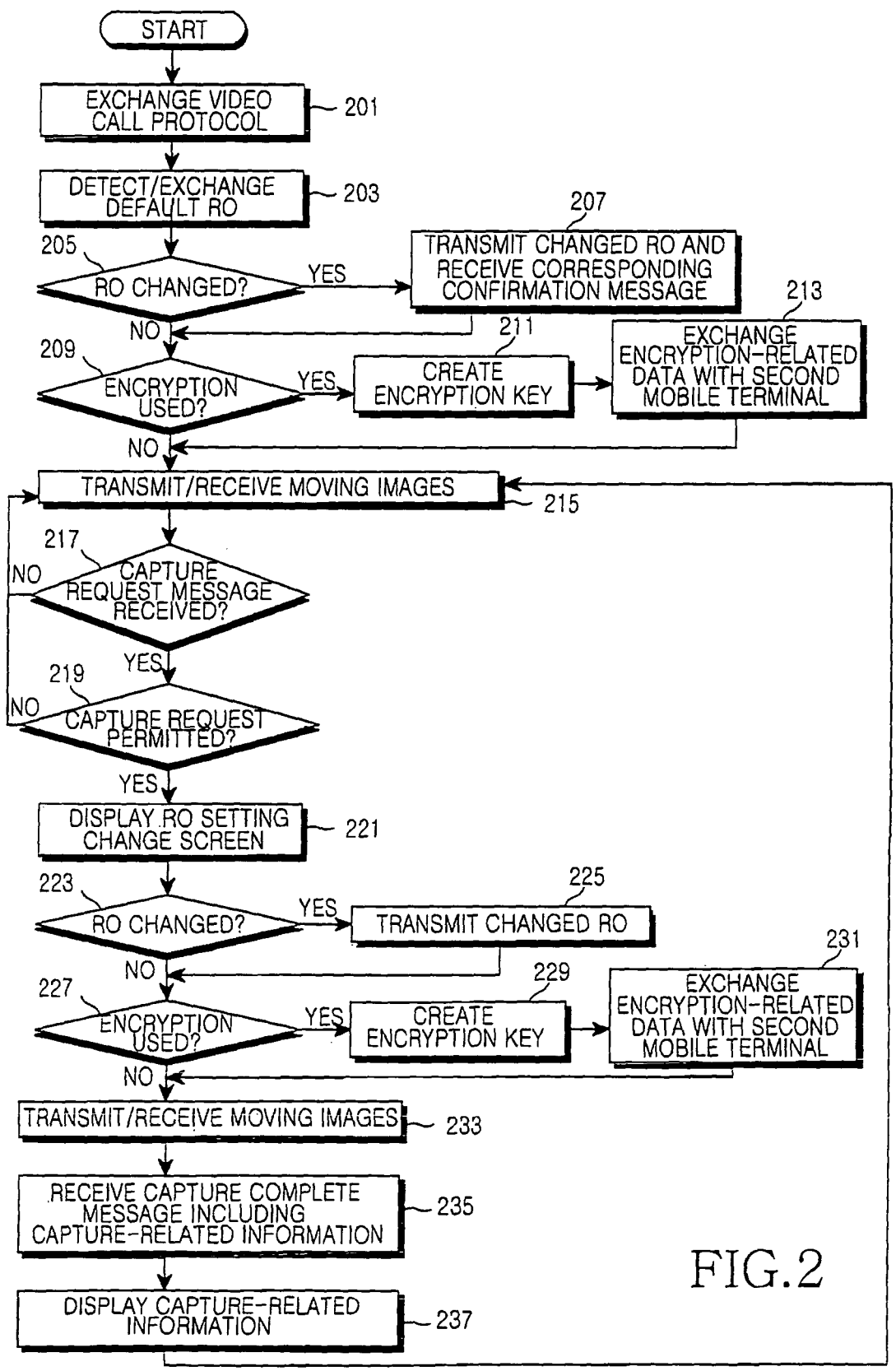
FIG. 2 is a flowchart illustrating a procedure for performing a video call in a first mobile terminal, according to the present invention.

FIG. 2 is a flowchart illustrating a procedure for performing a video call at a first mobile terminal, according to the present invention.

Referring to FIG. 2, when a user presses a video call button of the first mobile terminal, the controller 100 of the first mobile terminal exchanges various control data (e.g., codec performance) for a video call with the second mobile terminal in step 201. In step 203, the controller 100 detects and exchanges preset multimedia content ROs (i.e., default ROs) with the second mobile terminal. A mobile terminal manufacturer, a video call service provider, or a mobile communication operator may preset the default ROs.

In step 205, the controller 100 determines if the user changes the ROs. If not, the controller 100 directly proceeds to step 209; and if so, the controller 100 sequentially proceeds to step 207 and step 209. In step 207, the controller 100 transmits the changed ROs to the second mobile terminal and receives a corresponding confirmation message from the second mobile terminal.

In step 209, the controller 100 determines if encryption is used for the video call. If not, the controller 100 directly proceeds to step 215; and if so, the controller 100 sequentially proceeds to step 211, step 213 and step 215. The use or not of the encryption may be preset at the terminal manufacturing stage or may be set by the user. In step 211, the controller 100 creates an encryption key. The content controller 126 under the control of the controller 100 may create the encryption key. In step 213, the controller 100 exchanges encryption-related data (e.g., the created encryption key) with the second mobile terminal, thereby completing the basic settings for the video call.

Figure 5A:
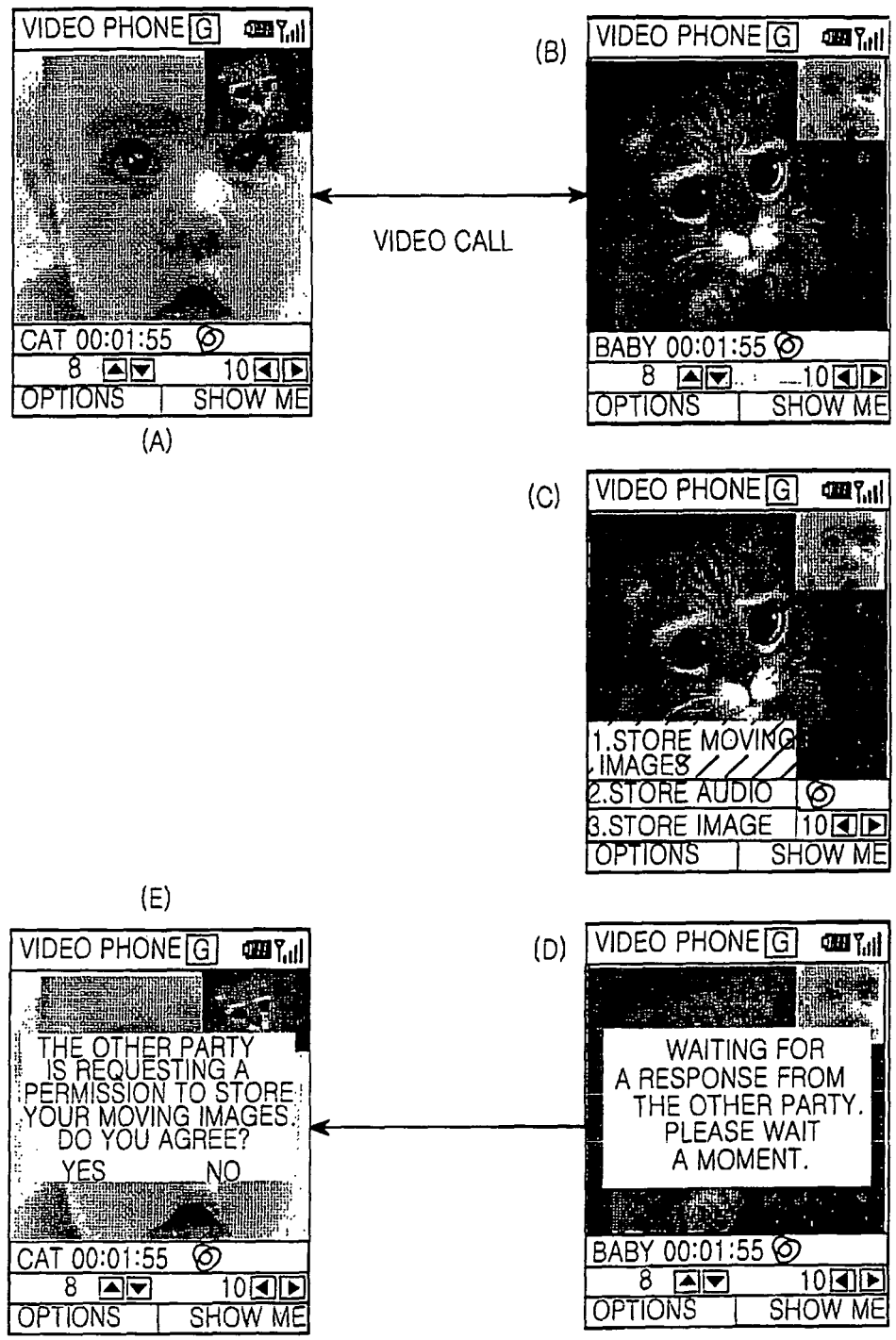
FIGS. 5A and 5B are diagrams illustrating screens displayed during the video call, according to the present invention.

In step 215, the controller 100 performs an actual video call by exchanging moving image signals and voice signals with the second mobile terminal as illustrated in FIGS. 5A(a) and 5A(b). FIGS. 5A(a) and 5A(b) illustrate a display screen of the first mobile terminal and a display screen of the second mobile terminal, respectively.

In step 217, the controller 100 determines if a multimedia content capture request message (Capture_REQ) is received from the second mobile terminal during the video call. If not, the controller 100 returns to step 215; and if so, the controller proceeds to step 219. In step 219, the controller 110 determines if the user permits the capture request. At this point, the controller 100 displays a message for informing the user of the capture request on the display unit 110 as illustrated in FIG. 5A(e), and the user permits or rejects the capture request by pressing a "YES" button or a "NO" button.

Figure 5B:
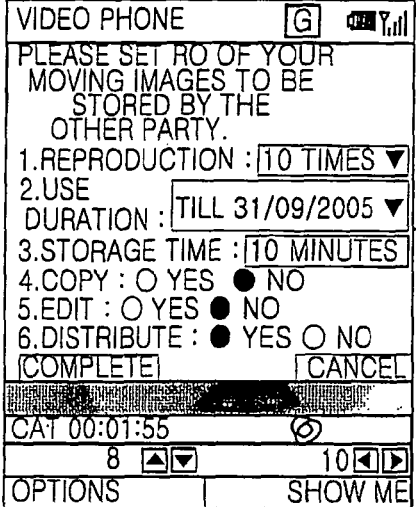

If the capture request is rejected, the controller 100 returns to step 215; and if the capture request is permitted, the controller 100 proceeds to step 221. In step 221, the controller 100 displays an RO setting change screen in a display window as illustrated in FIG. 5B(f). At this point, current ROs (e.g., the number of times of reproduction, usage duration, storage time, right to copy, edit, and distribution) are displayed and can be changed by the user.

In step 223, the controller 100 determines if the user changes the ROs. If not, the controller 100 directly proceeds to step 227; and if so, the controller 100 sequentially proceeds to step 225 and step 227. In step 225, the controller 100 transmits the changed ROs to the second mobile terminal.

In step 227, the controller 100 determines if encryption is used for the captured image. If not, the controller 100 directly proceeds to step 233; and if so, the controller 100 sequentially proceeds to step 229, step 231 and step 233. In step 229, the controller 100 creates an encryption key. The content controller 126 under the control of the controller 100 may create the encryption key. In step 231, the controller 100 exchanges encryption-related data (e.g., the created encryption key) with the second mobile terminal.

In step 233, the controller 100 performs an actual video call by exchanging moving image signals and voice signals (i.e., video and audio signals) with the second mobile terminal as illustrated in FIGS. 5B(h) and 5B(i). At this point, using the created encryption key, the controller 100 encrypts the video and audio signals to be transmitted.

In step 235, the controller 100 receives a capture complete message including capture-related information from the second mobile terminal during the video call. In step 237, the controller 100 displays the capture-related information as illustrated in FIG. 5B(j). Thereafter, the controller 100 returns to step 215.

The second mobile terminal's operation corresponding to the procedure illustrated in FIG. 2 will be described below.

Figure 3:
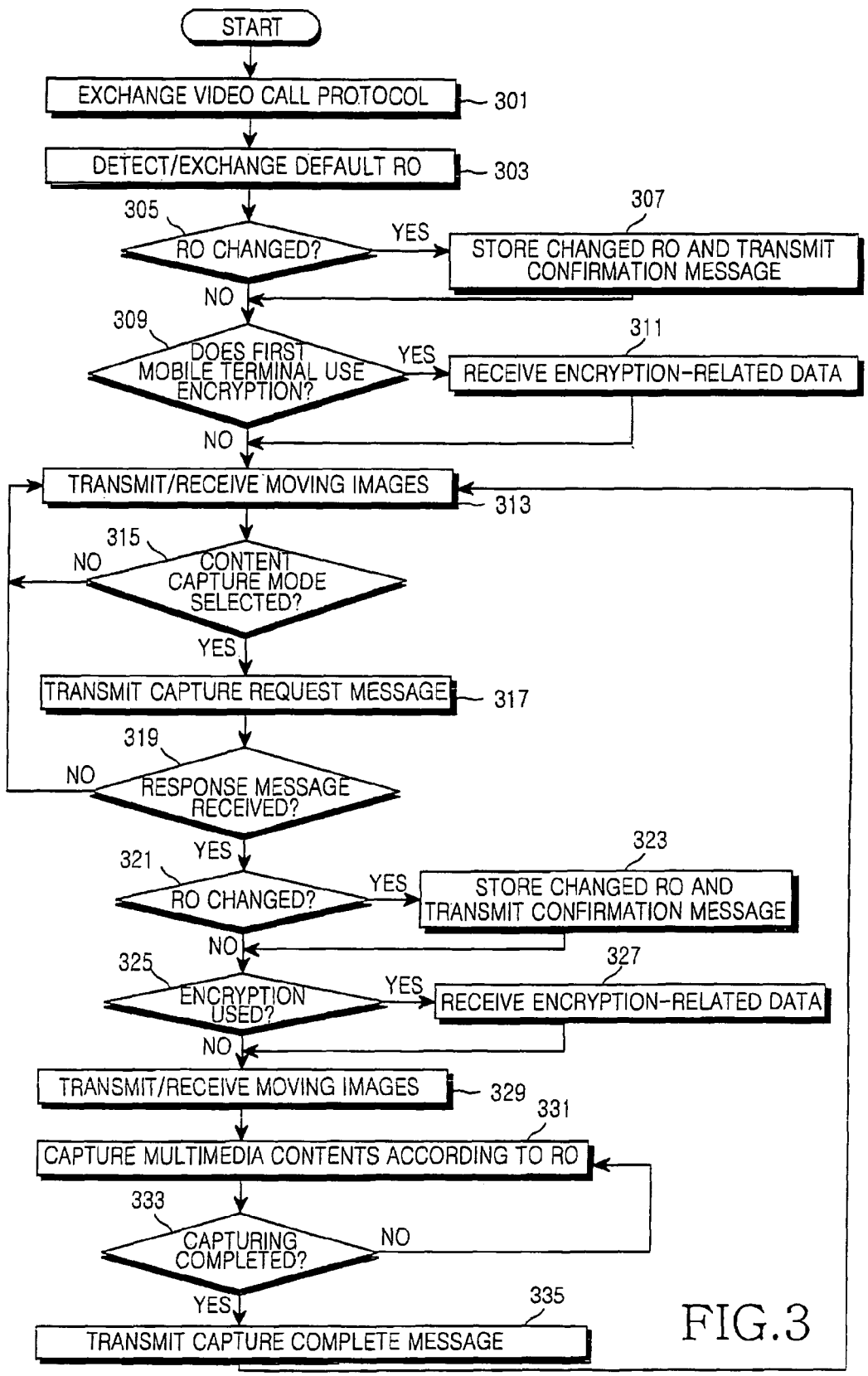
FIG. 3 is a flowchart illustrating a procedure for performing a video call in a second mobile terminal, according to the present invention.

FIG. 3 is a flowchart illustrating a procedure for performing a video call at the second mobile terminal, according to the present invention. Referring to FIG. 3, when a video call is initiated, the controller 100 of the second mobile terminal exchanges various control data (e.g., codec performance) for a video call with the first mobile terminal in step 301. In step 303, the controller 100 detects and exchanges preset multimedia content ROs (i.e., default ROs) with the first mobile terminal. The default ROs may be preset by a mobile terminal manufacturer, a video call service provider, or a mobile communication operator.

In step 305, the controller 100 determines if an RO change request message is received from the first mobile terminal. If not, the controller 100 directly proceeds to step 309; and if so, the controller 100 sequentially proceeds to step 307 and step 309. In step 307, the controller 100 stores the changed ROs and transmits a confirmation message to the first mobile terminal.

In step 309, the controller 100 determines if the first mobile terminal uses encryption. If not, the controller 100 directly proceeds to step 313; and if so, the controller 100 sequentially proceeds to step 311 and step 313. In step 311, the controller 100 receives the encryption-related data (e.g., the encryption key) from the first mobile terminal, thereby completing the basic settings for the video call.

In step 313, the controller 100 performs an actual video call by exchanging moving image signals and voice signals (i.e., video and audio signals) with the first mobile terminal as illustrated in FIGS. 5A(a) and 5A(b). FIGS. 5A(a) and 5A(b) illustrate the display screen of the first mobile terminal and the display screen of the second mobile terminal, respectively.

In step 315, the controller 100 determines if a user of the second mobile terminal selects a content capture (storage) mode during the video call, as illustrated in FIG. 5A(c). If not, the controller 100 returns to step 313; and if so, the controller proceeds to step 317. In step 317, the controller 110 transmits a capture request message to the first mobile terminal and displays a standby screen on a display window as illustrated in FIG. 5A(d).

In step 319, the controller 100 determines if a response message for the capture request message is received from the first mobile terminal. If not, the controller 100 returns to step 313; and so, the controller 100 proceeds to step 321. In step 321, the controller 100 analyzes the response message, displays the screen of FIG. 5B(g), and determines if the ROs of the first mobile terminal have been changed. If not, the controller 100 directly proceeds to step 325; and if so, the controller 100 sequentially proceeds to step 323 and step 325. In step 323, the controller 100 stores the changed ROs and transmits a corresponding confirmation message to the first mobile terminal.

In step 325, the controller 100 determines if the first mobile terminal uses encryption for captured moving images. If not, the controller 100 directly proceeds to step 329; and if so, the controller 100 sequentially proceeds to step 327 and step 329. In step 327, the controller 100 receives the encryption-related data (e.g., the encryption key) from the first mobile terminal.

In step 329, the controller 100 performs an actual video call by exchanging moving image signals and voice signals with the first mobile terminal as illustrated in FIGS. 5B(h) and 5B(i). At this point, using the received encryption key, the controller 100 recovers original moving images from the received moving images.

In step 331, the controller 100 captures multimedia contents according to the ROs received from the first mobile terminal. In step 333, the controller 100 determines if the capturing of multimedia contents is completed. If not, the controller 100 returns to step 331; and if so, the controller 100 proceeds to step 335. In step 335, the controller 100 transmits a capture complete message including capture-related information to the first mobile terminal. Thereafter, the controller 100 returns to step 313. The captured multimedia contents are managed according to the ROs received from the first mobile terminal.

For better understanding of the present invention, a signal exchange procedure between the first and second mobile terminals will be described below with reference to the flowchart of FIG. 4.

Figure 4:
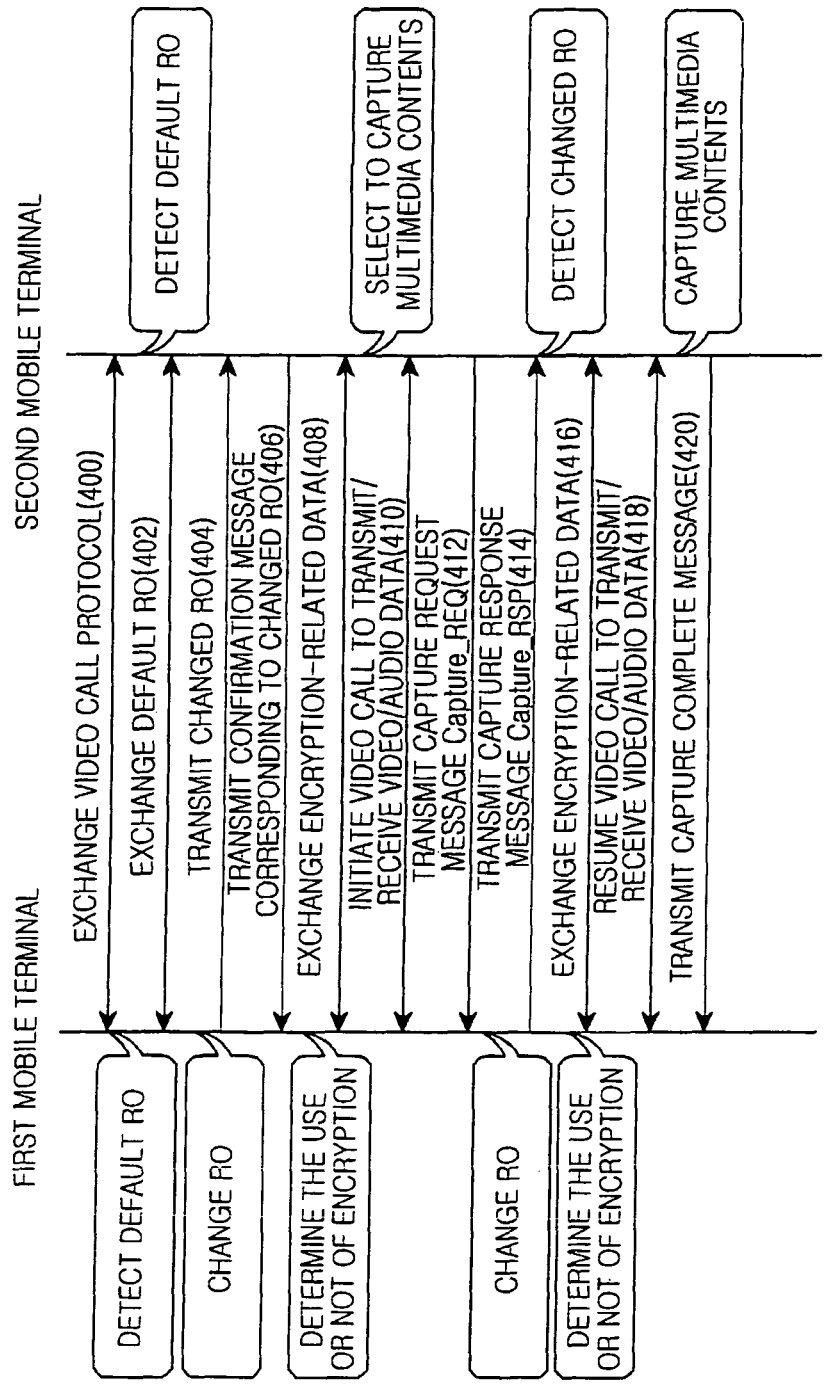
FIG. 4 is a flow diagram illustrating a signal exchange procedure between the first and second mobile terminals, according to the present invention.

Referring to FIG. 4, in order to set up a video call, the first and second mobile terminals exchange protocol signals for the video call in step 400. At this point, the video call protocol is the H.245 protocol. In step 402, the first and second mobile terminals exchange default multimedia content ROs that were preset by a mobile terminal manufacturer, a video call service provider, or a mobile communication operator. At this point, the first and second mobile terminals detect the default multimedia content RO of the other party terminal and may display the detected ROs on their display units.

If a user changes the ROs of the first mobile terminal, it transmits the changed ROs to the second mobile terminal in step 404. Upon receiving the changed ROs from the first mobile terminal, the second mobile terminal transmits a confirmation message corresponding to the changed ROs to the first mobile terminal in step 406.

If encryption is used in the first mobile terminal, the first mobile terminal creates encryption-related data (e.g., an encryption key) and transmits the encryption-related data to the second mobile terminal in step 408. In step 410, the first and second mobile terminals initiate a video call to transmit/receive video/audio data that are encrypted.

If a user of the second mobile terminal elects to capture multimedia contents of the other party during the video call, the second mobile terminal transmits a multimedia content capture request message Capture_REQ to the first mobile terminal in step 412. At this point, the first mobile terminal displays an RO setting change screen and a user of the first mobile terminal changes the ROs using the RO setting change screen. In step 414, the first mobile terminal transmits a capture response message Capture_RSP including the changed ROs to the second mobile terminal.

Thereafter, if encryption is used in the first mobile terminal, the first mobile terminal creates encryption-related data and transmits the encryption-related data to the second mobile terminal in step 416. In step 418, the first and second mobile terminals resume the video call by exchanging video/audio data that are encrypted. At this point, the second mobile terminal captures and stores currently-played multimedia contents according to the changed ROs.

Upon completion of the capturing of the multimedia contents, the second mobile terminal transmits a capture complete message to the first mobile terminal in Step 420. Upon receipt of the capture complete message, the first mobile terminal displays the ROs of the captured multimedia contents.

In the above embodiment, the ROs exchanged during the video call setup are the default ROs that were preset by one of the mobile terminal manufacturer, the video call service provider, or the mobile communication operator. In another embodiment, the ROs exchanged during the video call setup may be ROs that are preset by the user. In this case, the mobile terminal attempts to capture multimedia contents according to the ROs that were preset by the user.

As described above, the mobile terminals exchange ROs of the multimedia contents during the video call, thereby making it possible to protect the portrait rights during the video call. In addition, the mobile terminals exchange the RO data about the number of times of reproduction, the use duration, the storage time, and the right to copy, edit, and distribute with respect to the captured multimedia contents, thereby making it possible to provide users with a video call service with enhanced security.

While the present invention has been shown and described with reference to certain preferred embodiments thereof, it will be understood by those skilled in the art that various changes may be made therein without departing from the spirit and scope of the present invention as further defined by the appended claims.

What is claimed:

1. A mobile communication terminal comprising:
   a controller for exchanging protocol signals for a video call with an other party terminal, and demultiplexing a moving image that are received from the other party terminal;
   a display unit for displaying the received moving image;
   a codec for playing the received voice; and
   a content controller for managing Right Objects (ROs) of multimedia contents received from the other party terminal, and capturing the displayed moving image and the played voice according to the ROs,
   wherein the ROs include a first RO code indicating whether to permit capturing of moving images, still images and voice signals, and a second RO code indicating whether to permit reproducing, editing and distributing captured multimedia contents.

2. The mobile communication terminal of claim 1, wherein the ROs are exchanged at initial call setup and are changeable during a video call.

3. The mobile communication terminal of claim 1, wherein the content controller controls a multimedia content capture program, manages security-related encryption keys and RO settings, and controls contents according to the RO settings.

4. The mobile communication terminal of claim 1, wherein the video call protocol is an H.245 protocol.

5. A video telephony method for a mobile terminal, comprising the steps of:
   determining if a multimedia content capture request message is received from an other party terminal during a video call; and
   if the multimedia content capture request message is received, transmitting a response message including Right Objects (ROs) of multimedia contents to the other party terminal, the ROs of multimedia contents being set by a user of the mobile terminal,
   wherein the ROs include a first RO code indicating whether to permit capturing of moving images, still images and voice signals, and a second RO code indicating whether to permit reproducing, editing and distributing captured multimedia contents.

6. The video telephony method of claim 5, further comprising displaying a screen for changing the ROs of multimedia contents, if the multimedia content capture request message is received.

7. The video telephony method of claim 5, further comprising:
   receiving a capture complete message including capture-related information from the other party terminal; and
   displaying the capture-related information.

8. The video telephony method of claim 5, further comprising exchanging currently-set ROs of multimedia contents with the other party terminal during call setup.

9. The video telephony method of claim 8, wherein the exchanged ROs are default data that are preset by one of a mobile terminal manufacturer, a video call service provider, and a mobile communication operator.

10. The video telephony method of claim 8, wherein the exchanged ROs are data that are preset by the user.

11. A video telephony method for a mobile terminal, comprising the steps of:
    determining if a user of the mobile terminal selects to capture multimedia contents from another party terminal during a video call;
    if the capturing mode is selected, transmitting a multimedia content capture request message to the other party terminal; and
    receiving a response message including Right Objects (ROs) of multimedia contents from the other party terminal,
    wherein the ROs include a first RO code indicating whether to permit capturing of moving images, still images and voice signals, and a second RO code indicating whether to permit reproducing, editing and distributing of captured multimedia contents.

12. The video telephony method of claim 11, further comprising:
    capturing currently-displayed multimedia contents according to the ROs included in the response message; and
    after completion of the capturing step, transmitting a capture complete message including capture-related information to the other party terminal.

13. A video telephony method comprising the steps of:
    performing a video call between a first mobile terminal and a second mobile terminal;
    transmitting a multimedia content capture request message from the second mobile terminal to the first mobile terminal during the video call;
    transmitting a response message including Right Objects (ROs) of multimedia contents from the first mobile terminal to the second mobile terminal, the ROs being preset by a user of the first mobile terminal; and
    capturing multimedia contents of the other party at the second mobile terminal according to the ROs, the other party being the user of the first mobile terminal,
    wherein the ROs include a first RO code indicating whether to permit capturing of moving images, still images and voice signals, and a second RO code indicating whether to permit reproducing, editing and distributing captured multimedia contents.

14. The video telephony method of claim 13, further comprising:
    transmitting a capture complete message including capture-related information from the second mobile terminal to the first mobile terminal after completion of the capturing step; and
    displaying the capture-related information on a display unit of the first mobile terminal.

15. A video telephony method comprising the steps of:
    exchanging protocol signals for a video call between a first mobile terminal and a second mobile terminal to set up a call therebetween;

exchanging preset Right Objects (ROs) of multimedia contents between the first mobile terminal and the second mobile terminal after the call setup;

performing the video call after the exchange of the preset ROs;

transmitting a multimedia content capture request message from the second mobile terminal to the first mobile terminal during the video call;

transmitting a response message including a capture permission/rejection notice from the first mobile terminal to the second mobile terminal; and if the response message includes a capture permission notice, capturing multimedia contents of the other party at the second mobile terminal according to the exchanged ROs, the other party being a user of the first mobile terminal, wherein the ROs include a first RO code indicating whether to permit capturing of moving images, still images and voice signals, and a second RO code indicating whether to permit reproducing, editing and distributing of captured multimedia contents.

16. The video telephony method of claim 15, further comprising:

transmitting a capture complete message including capture-related information from the second mobile terminal to the first mobile terminal after completion of the capturing step; and displaying the capture-related information on a display unit of the first mobile terminal.

17. A mobile communication terminal comprising:

a controller for exchanging protocol signals for a video call with an other party terminal, and demultiplexing a moving image that are received from the other party terminal;

a display unit for displaying the received moving image; and a content controller for managing Right Objects (ROs) of multimedia contents received from the other party terminal, and capturing the displayed moving image according to the ROs, wherein the ROs include a first RO code indicating whether to permit capturing of moving images, still images and voice signals, and a second RO code indicating whether to permit reproducing, editing and distributing captured multimedia contents.

\* \* \* \* \*